(12) United States Patent
Onishi et al.

(10) Patent No.: US 8,155,930 B2
(45) Date of Patent: Apr. 10, 2012

(54) SIMULATION APPARATUS, METHOD AND PROGRAM

(75) Inventors: Dai Onishi, Tokyo (JP); Yutaka Fujita, Tokyo (JP)

(73) Assignee: IHI Corporation, Tokyo (JP)

( * ) Notice: Subject to any disclaimer, the term of this patent is extended or adjusted under 35 U.S.C. 154(b) by 420 days.

(21) Appl. No.: 12/306,897

(22) PCT Filed: Jun. 12, 2007

(86) PCT No.: PCT/JP2007/061775
§ 371 (c)(1),
(2), (4) Date: Dec. 29, 2008

(87) PCT Pub. No.: WO2008/001606
PCT Pub. Date: Jan. 3, 2008

(65) Prior Publication Data
US 2009/0326891 A1 Dec. 31, 2009

(30) Foreign Application Priority Data

Jun. 28, 2006 (JP) .................. 2006-177776

(51) Int. Cl.
*G06F 17/50* (2006.01)

(52) U.S. Cl. ........... 703/2; 703/5; 703/7; 700/245; 318/566.16; 435/6

(58) Field of Classification Search .......... 703/5, 7, 703/2; 435/6; 318/568.16, 566.16; 700/245
See application file for complete search history.

(56) References Cited

U.S. PATENT DOCUMENTS

| | | | | |
|---|---|---|---|---|
| 5,737,075 | A * | 4/1998 | Koch et al. ............... | 356/310 |
| 7,061,200 | B2 * | 6/2006 | Iribe ............... | 318/568.16 |
| 2004/0181305 | A1 | 9/2004 | Hertinger | |
| 2005/0055134 | A1 * | 3/2005 | Okuda et al. .............. | 700/245 |
| 2006/0052901 | A1 * | 3/2006 | Nihei et al. .............. | 700/245 |
| 2009/0023447 | A1 * | 1/2009 | Hagerman et al. .......... | 455/436 |
| 2009/0117542 | A1 * | 5/2009 | Maybruck et al. .......... | 435/6 |

FOREIGN PATENT DOCUMENTS

| | | |
|---|---|---|
| JP | 10-171638 | 6/1998 |
| JP | 2000-259236 | 9/2000 |
| JP | 2000-276217 A | 10/2000 |

(Continued)

OTHER PUBLICATIONS

Office Action issued in corresponding Chinese Application No. 200780024584.4, mailed Apr. 26, 2010.
International Search Report issued in corresponding application No. PCT/JP2007/061775, completed Jul. 11, 2007 and mailed Jul. 24, 2007.
Office Action issued on Aug. 10, 2011 in corresponding Chinese Patent Application No. 200780024584.4.

(Continued)

*Primary Examiner* — Thai Phan
(74) *Attorney, Agent, or Firm* — Griffin & Szipl, P.C.

(57) ABSTRACT

A simulation apparatus 10 carries out simulation for associated operation equipment 2 provided with a plurality of mobile devices 5a, 5b, 5c, 5d, 7a, 7b, and 7c for operating in association with each other, and a control device 9 with a storage unit for storing a control program in which operation procedures are determined for the mobile devices to output control signals to the mobile devices. The simulation apparatus includes a storage device 10a for storing a simulation program to carry out simulation of the associated operation of the mobile devices on the basis of the control signals, and an arithmetic operation device 10c for receiving the control signals to execute the simulation program on the basis of the control signals.

12 Claims, 5 Drawing Sheets

FOREIGN PATENT DOCUMENTS

| | | |
|---|---|---|
| JP | 2005-202737 A | 7/2005 |
| JP | 2005-224855 | 8/2005 |
| JP | 2005-301365 | 10/2005 |
| JP | 2006-116583 | 5/2006 |
| JP | 2006116583 A | 5/2006 |

OTHER PUBLICATIONS

Office Action issued on Nov. 17, 2011 in priority Japanese Patent Application No. 2006-177776.

* cited by examiner

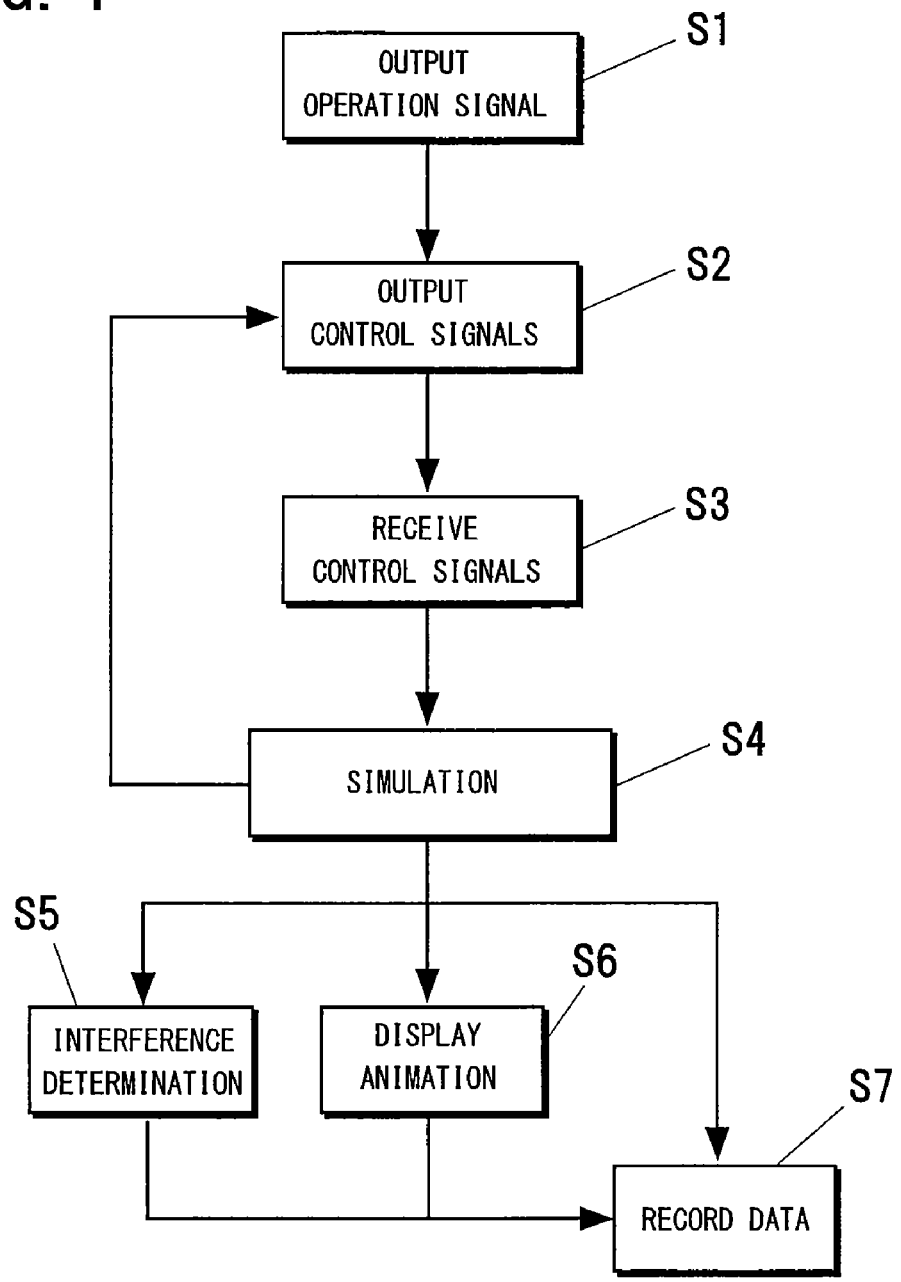

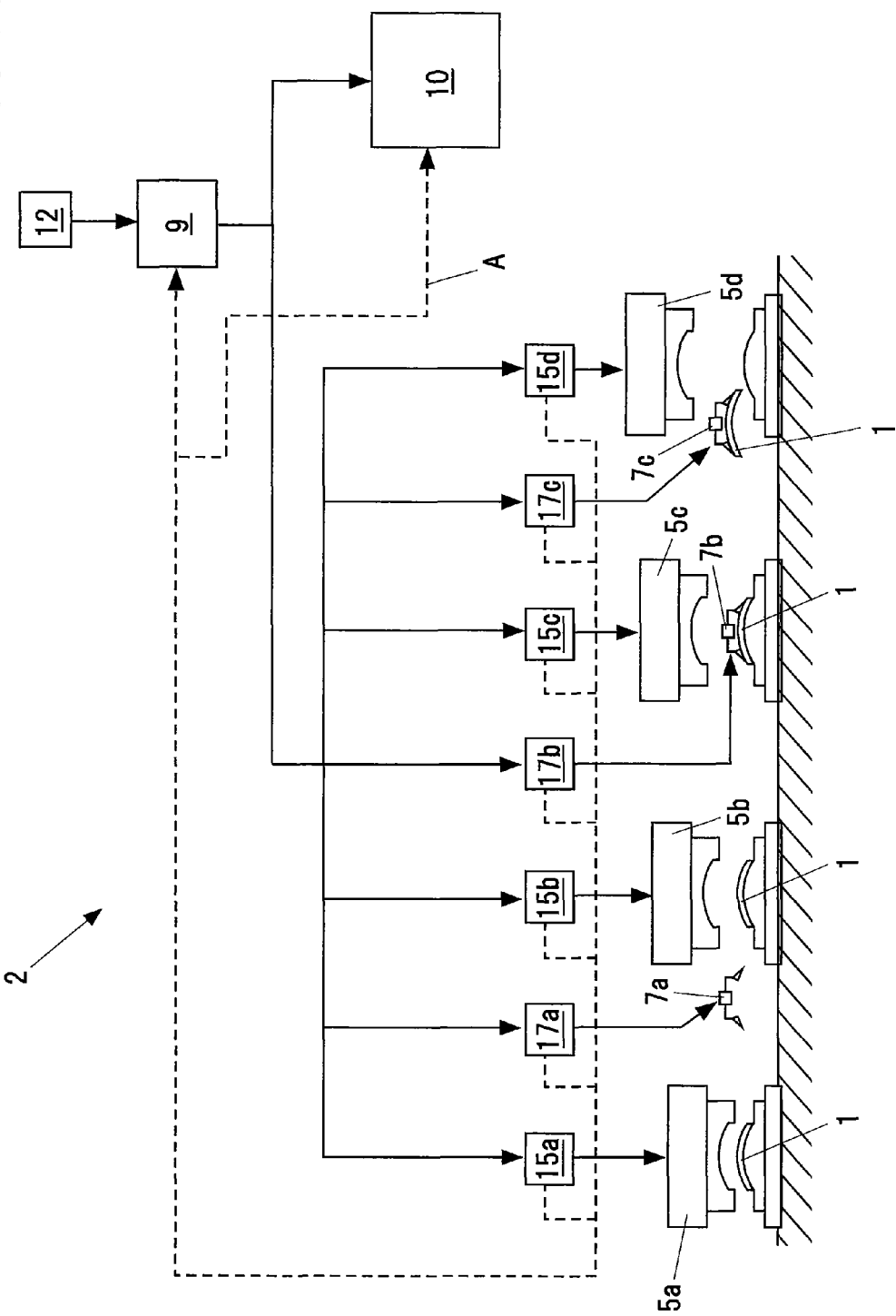

US 8,155,930 B2

SIMULATION APPARATUS, METHOD AND PROGRAM

This is a National Phase Application in the United States of International Patent Application No. PCT/JP2007/061775, filed Jun. 28, 2006, which claims priority on Japanese Patent Application No. 177776/2006, filed Jun. 12, 2007. The entire disclosures of the above patent applications are hereby incorporated by reference.

TECHNICAL FIELD OF THE INVENTION

The present invention relates to, for example, a technique for carrying out simulation for an automatically controlled tandem press line. In addition, the invention generally relates to a technique for carrying out simulation for automatically controlled associated operation equipment provided with a plurality of mobile devices that operate in association with each other, in addition to simulation for the tandem press line.

DESCRIPTION OF THE RELATED ART

As an apparatus that performs a press process on a work in order, and finishes the work, there is a tandem press line apparatus.

The tandem press line apparatus includes a plurality of presses, and a transferring device disposed between the adjacent presses. The plurality of presses are disposed in predetermined order, the transferring device transfers the work from the upstream press to the downstream press. As described above, the work processed by the upstream press is transferred to the adjacent downstream press by the transferring device, and the next press process is performed there.

Such a tandem press line can be automatically controlled. FIG. 1 is a diagram illustrating a configuration of such a tandem press line 2. As shown in FIG. 1, the tandem press line 2 includes an operation device 12 (e.g., operation panel), a control device 9 (e.g., sequencer), a plurality of presses 5a, 5b, 5c, and 5d, and transferring devices 7a, 7b, and 7c.

The operation device 12 is operated by an operator, whereby it is possible to perform operations such as stop and restart of the operation of press line. The operation device 12 outputs an operation signal base on the performed operation to the control device 9. The control device 9 outputs control signals to the driving device 15a, 15b, 15c, 15d, 17a, 17b, and 17c of the presses 5a, 5b, 5c, and 5d and the transferring devices 7a, 7b, and 7c, on the basis of the operation signal received from the operation device 12. These driving devices drive the corresponding presses 5a, 5b, 5c, and 5d, and transferring devices 7a, 7b, 7c on the basis of the control signals.

As described above, the operation device 12 outputs the signal based on the operation of the operator, and the control device 9 performs various kinds of controls including start and stop of the operation of the press line, on the basis of the signal.

In such a tandem press line 2, for example, when an operator operates the operation device 12 so that the control device 9 controls the driving to stop on the way of the driving due to any cause (e.g., cause of emergency stop such as breakdown), the stop cause is removed. Then, when the operator operates the operation device 12 so that the control device 9 controls the driving to restart, the control device 9 needs to control a restoration operation to be performed. The restoration operation means that all the presses 5a, 5b, 5c, and 5d return to the initial positions (e.g., waiting positions at the top dead center) and all the transferring devices 7a, 7b, and 7c are moved to the initial positions.

The restoration operation needs to be performed so that the presses 5a, 5b, 5c, and 5d, and the transferring devices 7a, 7b, and 7c return to the initial positions in proper order. If they do not return in the proper order, interference (e.g., collision or opposition of excessive force, etc.) occurs between the press and the transferring device adjacent to each other, and the mobile devices thereof are broken down. For example, when a press upper die is located at a stop position in the course of descending and the transferring device is located between the press upper die and the press lower die, and when the control to move the press upper die to the top dead center is performed, the press upper die further descends to collide with the transferring device, thereby breaking down the mobile devices thereof. Accordingly, the control needs to be performed so that the presses 5a, 5b, 5c, and 5d, and the transferring devices 7a, 7b, and 7c return to the initial positions in order that the interference does not occur.

For this reason, the control device 9 functions as follows.
As the first function, the control device 9 receives position signals from the presses 5a, 5b, 5c, and 5d, and the transferring devices 7a, 7b, and 7c, which represent operation positions thereof (see a broken-line arrow in FIG. 1), thereby catching the operation position of each mobile device at each time point.

As the second function, in a control program stored in the control device 9, operation procedures for returning the presses 5a, 5b, 5c, and 5d, and the transferring devices 7a, 7b, and 7c from assumable various stop states of the press line to the initial positions are predetermined for each stop state.

According to these functions, when the press line is in the stop state and the signal representing the restart of the driving is input from the operation device 12 to the control device 9, the control device 9 executes the control program on the basis of the position signals representing the stop positions of the presses 5a, 5b, 5c, and 5d, and the transferring devices 7a, 7b, and 7c at the present time point, and performs a restoration operation control to move the mobile devices to the initial positions.

In the above-described control program, the operation procedures of the mobile devices are determined. When the restoration operation procedures are not appropriately defined, the mobile devices interfere with each other. For this reason, it is important to verify whether or not there is a problem in the operation procedures determined in the control program.

The technique for verifying whether or not there is a problem in the control program is described, for example, in Patent Documents 1 and 2.

In Patent Document 1, there is described a verifying apparatus for control software verifying whether or not control software under design performs intended control. The verifying apparatus includes a control program analysis means for extracting an operation signal of an operation device of a control target from control software under design, and an animation means for displaying operation of the control target in animation on the basis of the operation signal. A detection signal of the operation of the control target is sent from the animation means to the control program analysis means, and the operation of the control target is displayed in animation, in consideration of both operation signal and detection signal. That is, on the display screen for displaying the animation, it can be confirmed whether or not the control software performs intended control.

In Patent Document 2, there is described an apparatus for carrying out simulation for easily confirming a robot operation program at a place in which a robot is installed. The apparatus is an operation controller connected to an driving controller of the robot to instruct various operations. The operation controller includes a touch-panel display unit, an animation creating means, and a simulation processing means.

On the touch-panel display unit, robot pseudo-images is displayed, and various operation keys are displayed in a touch-operable manner. The animation creating means produces a moving image of the robot pseudo-image to display it on the display unit. The simulation processing means drives the animation creating means to display the robot pseudo-image in animation. It is possible to confirm whether or not there is a problem in the robot operation program by displaying such a robot pseudo-image in animation.

[Patent Document 1] Japanese Patent Application Laid-Open No. 10-171638, "APPARATUS AND METHOD FOR VERIFYING CONTROL SOFTWARE"

[Patent Document 2] Japanese Patent Application Laid-Open No. 2005-301365, "OPERATION CONTROLLER HAVING SIMULATOR FUNCTION"

The technique described in Patent Documents 1 and 2 is a technique about simulation for a single control target (e.g., robot), but is not a simulation technique about the associated operation of the whole associated operation equipment such as the tandem press line 2. Accordingly, in the techniques described in Patent Documents 1 and 2, it is difficult to visibly confirm the associated operation of the whole press line.

In Patent Documents 1 and 2, it is possible to confirm the operation animation of the control target on the display screen, but a great effort is necessary when there are enormous operations to be confirmed.

Even in the case of using the techniques described in Patent Documents 1 and 2, it is difficult to determine whether or not there is a problem about detailed operations since the animation on the screen is confirmed by human eyes. In addition, when it is confirmed by human eyes whether or not there is a problem with respect to a great number of operation procedures, erroneous judgment may occur.

SUMMARY OF THE INVENTION

An object of the invention is to provide a technique capable of confirming the associated operation of the whole associated operation equipment determined by a control program, and reliably determining whether there is a problem in the control program, without a great effort and time.

According to the invention, there is provided a simulation apparatus for carrying out simulation for associated operation equipment provided with a plurality of mobile devices that operate in association with each other, and a control device having a storage unit for storing a control program in which operation procedures are determined for the mobile devices to output control signals to the mobile devices, the simulation apparatus comprising:

a storage device that stores a simulation program for carrying out simulation of the associated operation of the mobile devices on the basis of the control signals; and an arithmetic operation device that receives the control signals to execute the simulation program on the basis of the control signals.

The simulation apparatus can carry out the simulation of the associated operation of the entire associated operation equipment on the basis of the simulation program. In addition, since the simulation is carried out in the state where the control device that is the constituent element of the associated operation equipment is activated, it is possible to confirm both whether or not there is a problem in the control program and whether or not there is a problem in the operation of the control device.

According to a preferred embodiment of the invention, the mobile devices have movement ranges partially overlapping with each other, and wherein the arithmetic operation device determines whether or not the mobile devices interfere with each other, on the basis of the carried-out simulation.

As described above, the arithmetic device automatically determines whether or not the mobile devices interfere with each other. Accordingly, it is possible to accurately confirm whether or not there is interference without a great effort and time, unlike the case of determination based on user's eyes on the screen.

According to a preferred embodiment of the invention, wherein the associated operation equipment is operable by a user to instruct the associated operation equipment to operate, and has an operation device outputting an operation signal based on user's operation, and wherein the control device executes the control program on the basis of the operation signal.

As described above, the control device executes the control program and outputs the control signals, on the basis of the operation signal output from the operation device. Accordingly, it is possible to confirm whether the mobile devices interfere with each other in the operation which the operator wants to confirm, by instructing the operation using the operation device.

According to a preferred embodiment of the invention, the arithmetic operation device produces animation data representing the associated operation on the basis of the carried-out simulation, and wherein the simulation apparatus further comprises a display device that displays animation on the basis of the animation data.

With such a configuration, it is possible to visibly confirm the associated operation of the associated operation equipment with the animation. In addition, the operator can visibly confirm the associated operation of the processing devices and the transferring devices with the displayed animation, by operating the operation device. Accordingly, even when the processing devices and the transferring devices are not actually operated, the operation training of the operator may be performed. In addition, it is possible to simply and easily represent the operation procedures of the associated operation equipment determined in the control program, to the third person such as a customer of the equipment.

According to a preferred embodiment of the invention, the operation device is operable by a user to instruct the associated operation equipment to stop and restart the operation, wherein the control device executes the control program on the basis of the operation signal, by the control program, restoration operation procedures are determined to move the mobile devices from the operation stop positions to the initial positions, and the arithmetic operation device determines whether or not the mobile devices interfere with each other, when the restoration operation procedures are carried out.

When the operation of the associated operation equipment is stopped for emergency due to an operation problem or the like of the associated operation equipment, the mobile devices may easily interfere with each other in the course of returning the mobile devices from the stop positions to the initial positions of the driving.

In the aforementioned preferred embodiment, the operator operates the operation device to instruct the stop of the associated operation equipment, and then instructs the operation device to restart the associated operation equipment. Therefore, it is possible to confirm whether or not there is a problem in the restoration operation. In addition, the operation for instruction of stop may be performed at various timing. Accordingly, it is possible to carry out the simulation of the restoration operation from various stop states.

According to a preferred embodiment of the invention, the control device is configured to receive position signals representing operation positions of the mobile devices from the mobile devices, and to output the control signals on the basis of the position signals, and wherein the arithmetic operation device outputs pseudo position signals corresponding to the position signals to the control device on the basis of result data of the simulation, during carrying out the simulation, and the control device outputs the control signals to the arithmetic operation device on the basis of the pseudo position signals.

As described above, the operation device outputs the pseudo position signals on the basis of the result of the simulation, and the control device outputs the next control signals to the arithmetic operation device on the basis of the pseudo position signals. Accordingly, it is possible to carry out the simulation, while the operations of the mobile devices in the simulation are continuously traced.

According to a preferred embodiment of the invention, the simulation apparatus further includes a data recording device that records data about the result of the simulation carried out by the arithmetic operation device.

As described above, the data recording device records the data about the result of the simulation. Accordingly, the operation procedures of the control program on the basis of the recorded data can be examined in detail.

According to a preferred embodiment of the invention, the arithmetic operation device is connected to the mobile devices, and receives position signals representing the operation positions of the mobile devices from the mobile devices to produce animation data representing the associated operation of the mobile devices on the basis of the position signals, when the associated operation equipment is actually operating and wherein the display device displays animation on the basis of the animation data.

As described above, the actual operations can be displayed on the display device, as well as the operations in the simulation for the processing devices and the transferring devices. Accordingly, it is possible to perform remote monitoring of the associated operation equipment using the display device.

According to the invention, there is provided a simulation method for carrying out simulation for associated operation equipment provided with a plurality of mobile devices operating in association with each other, the mobile devices having movement ranges partially overlapping with each other, and a control device having a storage unit for storing a control program in which operation procedures are determined for the mobile devices to output control signals to the mobile devices, the simulation method comprising the steps of:

receiving the control signals; and carrying out the simulation for the whole associated operation equipment on the basis of the received control signals.

According to the invention, there is provided a simulation program for carrying out simulation for associated operation equipment provided with a plurality of mobile devices operating in association with each other, the mobile devices having movement ranges partially overlapping with each other, and a control device having a storage unit for storing a control program in which operation procedures are determined for the mobile devices to output control signals to the mobile devices, the simulation program for causing a computer to execute the processes of:

receiving the control signals; and carrying out the simulation for the whole associated operation equipment on the basis of the received control signals.

According to the above-described invention, it is possible to confirm the associated operations of the whole associated operation equipment determined by the control program, and thus it is possible to precisely determine whether or not there is a problem in the control program without a great effort and time.

BRIEF DESCRIPTION OF THE DRAWINGS

FIG. 4 is a flowchart illustrating a simulation method according to the first embodiment of the invention.

FIG. 5 is a diagram illustrating a simulation apparatus of a tandem press line according to a second embodiment of the invention.

DESCRIPTION OF THE PREFERRED EMBODIMENT

First Embodiment

Figure 1:
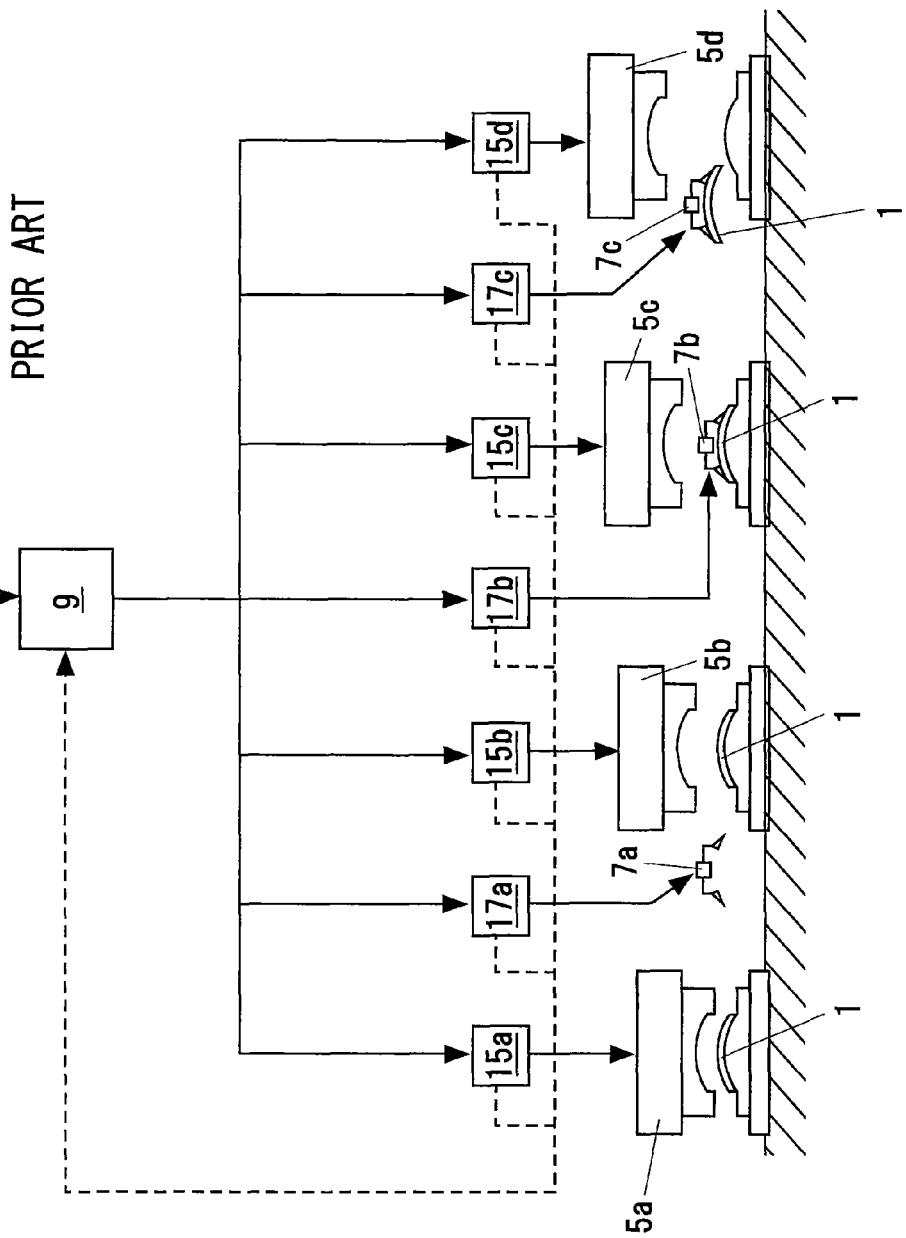
FIG. 1 is a diagram illustrating a configuration of a tandem press line to which the invention is applicable.

Preferred embodiments of the invention will be described with reference to the drawings. The same reference numerals are given to the common parts in the figures, and the description thereof will be omitted.

Figure 2:
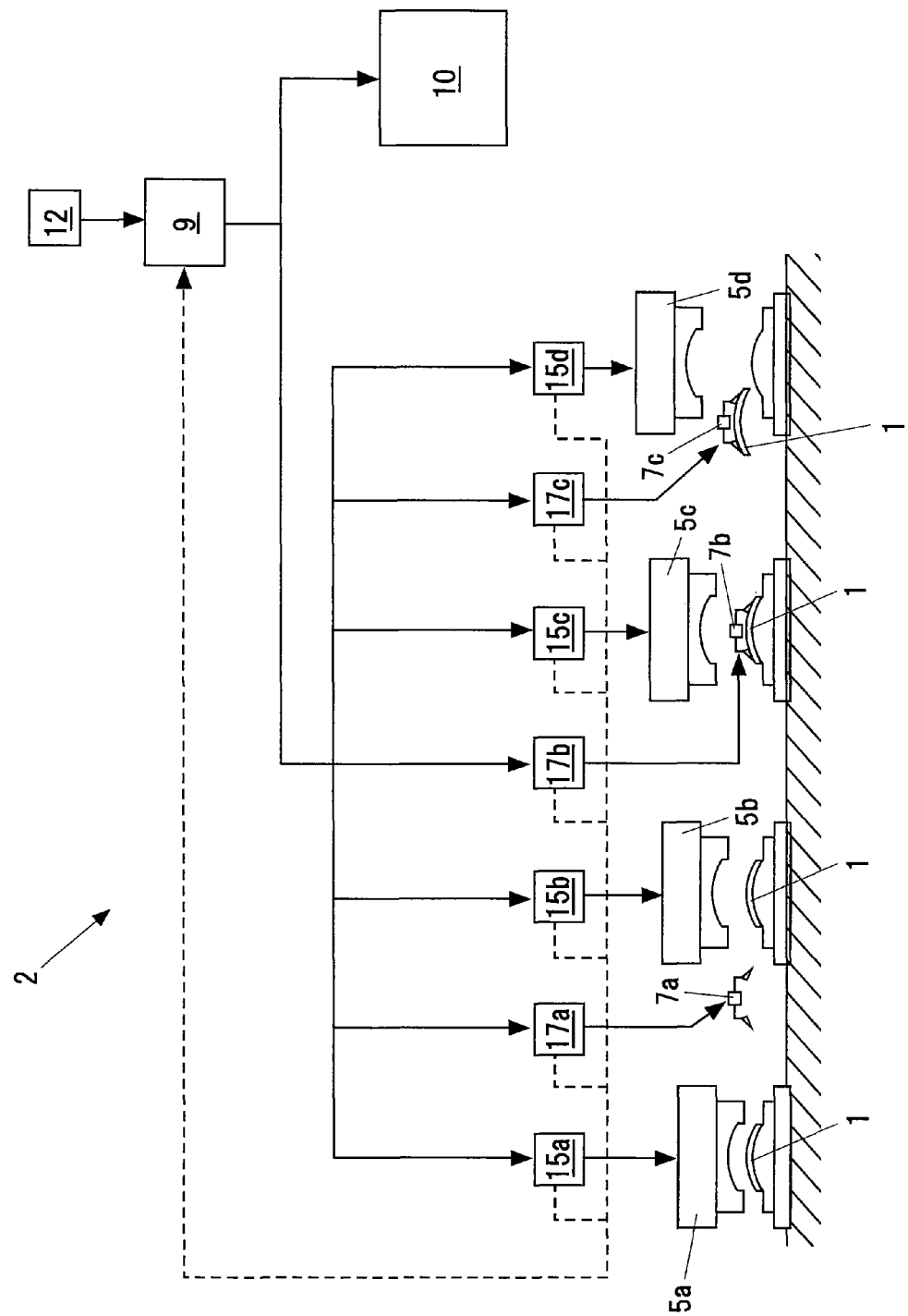
FIG. 2 is a diagram illustrating a simulation apparatus of a tandem press line according to a first embodiment of the invention.

FIG. 2 is a diagram illustrating a simulation apparatus 10 of a tandem press line 2 according to an embodiment of the invention. In the present embodiment, the simulation apparatus 10 carries out simulation for the tandem press line 2. The tandem press line 2 is an example of the aforementioned associated operation equipment.

As shown in FIG. 2, the tandem press line 2 includes: a plurality of presses 5a, 5b, 5c, and 5d disposed at intervals to press a work 1; transferring devices 7a, 7b, and 7c disposed between the presses 5a, 5b, 5c, and 5d to transfer the work 1 from one to the other of the presses adjacent to each other; and a control device 9 having a storage unit for storing a control program in which operation procedures are determined for the presses 5a, 5b, 5c, and 5d, and the transferring devices 7a, 7b, and 7c, to output control signals to the presses 5a, 5b, 5c, and 5d, and the transferring devices 7a, 7b, and 7c. The presses 5a, 5b, 5c, and 5d are examples of devices for performing a predetermined process on the work 1, and such a plurality of processing devices and the transferring devices 7a, 7b, and 7c are example of the aforementioned mobile devices.

As shown in FIG. 2, the tandem press line 2 is provided with an operation device 12 (e.g., operation panel) that is operable by a user to instruct the tandem press line 2 to operate, and that outputs an operation signal based on user's operation. The operation signal is input to the control device 9, and the control device 9 executes the control program on the basis of the operation signal and outputs the control signals.

The control signals are output to driving devices 15a, 15b, 15c, and 15d of the presses 5a, 5b, 5c, and 5d, and driving devices 17a, 17b, and 17c of the transferring devices 7a, 7b, and 7c, respectively. The driving devices drive the corresponding presses 5a, 5b, 5c, and 5d and transferring devices 7a, 7b, and 7c on the basis of the input control signals, respectively. Accordingly, the presses 5a, 5b, 5c, and 5d, and the transferring devices 7a, 7b, and 7c perform operations based on the control signals, respectively. The control device 9 may produce the control signal for each of the presses 5a, 5b, 5c, and 5d, and the transferring devices 7a, 7b, and 7c, and may output the control signal to the corresponding press 5a, 5b, 5c, or 5d, or transferring device 7a, 7b, or 7c. As shown by the broken line in FIG. 2, position signals representing operation positions of the corresponding presses 5a, 5b, 5c, and 5d, and transferring devices 7a, 7b, and 7c are output from the driving devices to the control device 9, and the control device 9 output control signals also on the basis of the position signals.

In the aforementioned control program, operation procedures are determined for the presses 5a, 5b, 5c, and 5d, and the transferring devices 7a, 7b, and 7c. Particularly, the movement ranges of the presses 5a, 5b, 5c, and 5d partially overlap with the movement ranges of the transferring devices 7a, 7b, and 7c. Accordingly, in the control program, the operation procedures are determined so that the presses 5a, 5b, 5c, and 5d, and the transferring devices 7a, 7b, and 7c do not interfere with each other.

Figure 3:
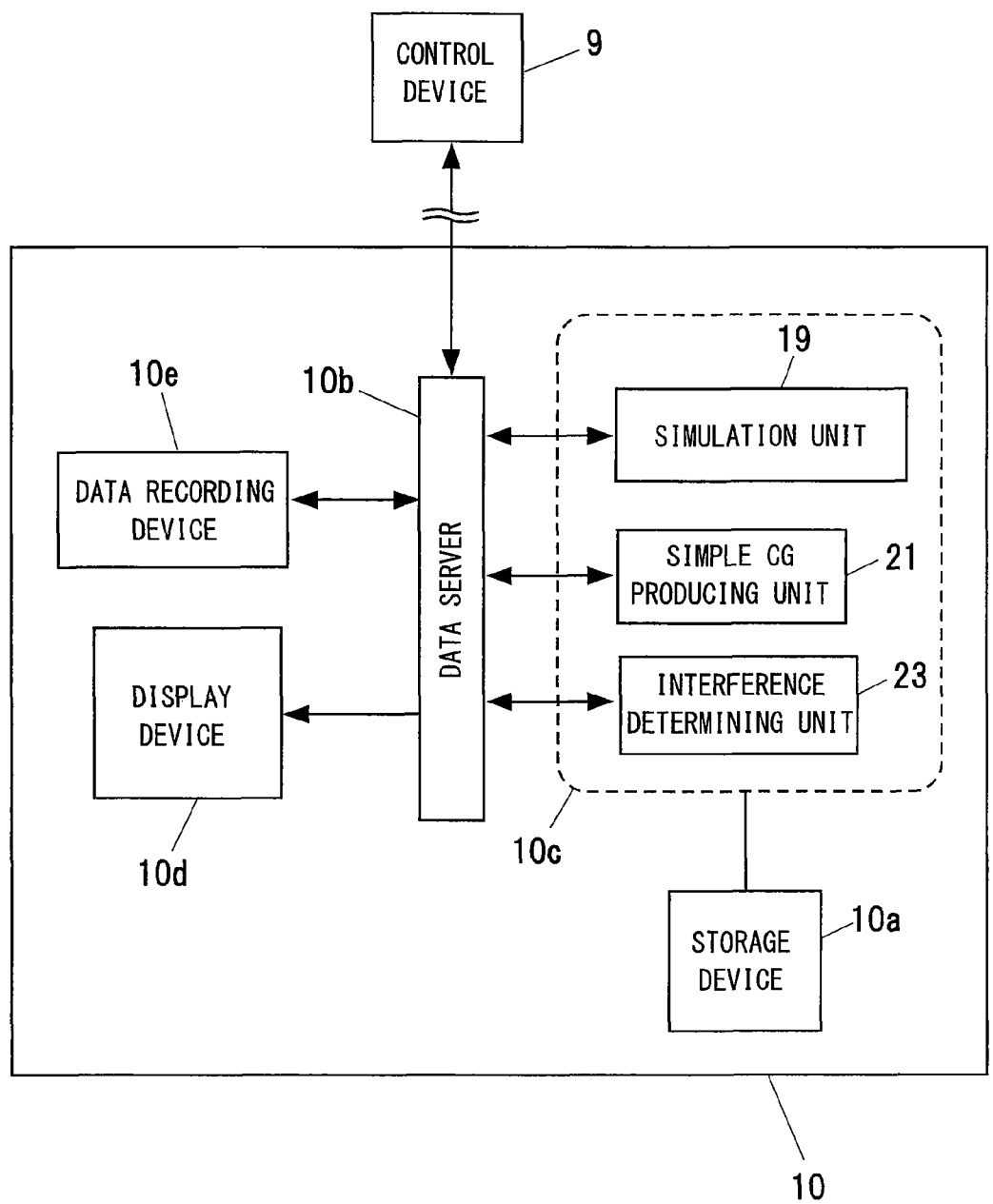
FIG. 3 is a diagram illustrating a configuration of the simulation apparatus shown in FIG. 2.

To confirm whether or not the operation procedures determined in the control program have a problem, the simulation apparatus 10 is provided. FIG. 3 is a diagram illustrating a configuration of the simulation apparatus 10.

The simulation apparatus 10 is configured by a computer, and includes a storage device 10a, a data server 10b, an arithmetic operation device 10c, a display device 10d, and a data recording device 10e. The arithmetic operation device 10c includes a simulation unit 19, a simple CG producing unit 21, and an interference determining unit 23.

The storage device 10a stores programs executed by the simulation device 10. That is, the storage device 10a stores a simulation program for carrying out simulation for the tandem press line 2 on the basis of control signals, a program for carrying out an interference determination, a program for producing animation data, and the like.

The data server 10b is a device having a function of transmitting data. Specifically, the data server 10b transmits control signals received from the control device 9, to the simulation unit 19 of the arithmetic operation device 10c. The data server 10b has a function of transmitting the result data of the simulation received from the simulation unit 19, to the simple CG producing unit 21, the interference determining unit 23, and the data recording device 10e.

The simulation unit 19 carries out movement simulation for the presses 5a, 5b, 5c, and 5d, and the transferring devices 7a, 7b, and 7c, on the basis of the control signals received from the control unit 9. The respective control signals for the presses 5a, 5b, 5c, and 5d, and the transferring devices 7a, 7b, and 7c are output from the control device 9. Accordingly, the movement simulation for each of the presses 5a, 5b, 5c, and 5d, and the transferring devices 7a, 7b, and 7c are carried out independently of each other on the basis of the control signals thereof. The respective result data of the movement simulation are transmitted through the data server 10b to the simple CG producing unit 21, the interference determining unit 23, and the data recording device 10e.

The interference determining unit 23 determines whether or not the presses 5a, 5b, 5c, and 5d, and the transferring devices 7a, 7b, and 7c interfere with each other, on the basis of the result data of the simulation transmitted from the simulation unit 19. This determination result data is transmitted through the data server 10b to the data recording device 10e.

The simple CG producing unit 21 produces animation data representing the movement of the presses 5a, 5b, 5c, and 5d, and the transferring devices 7a, 7b, and 7c by simple CG, on the basis of the result data of the simulation transmitted from the simulation unit 19. The animation data may be animation for allowing the display device 10d to display the whole associated operation of the tandem press line 2. The animation data may be produced to enlarge and display the detailed operation of the tandem press line 2 on the display device 10d. The animation data is transmitted through the data server 10b to the display device 10d.

The display device 10d displays the animation data received from the simple CG producing unit 21 on the screen thereof. The display device 10d may display the determination result data received from the interference determining unit 23 on the screen thereof.

The data recording device 10e records the result data of the simulation received from the simulation unit 19, the determination result data received from the interference determining unit 23, and the animation data received from the simple CG producing unit 21.

Next, a simulation method according to an embodiment of the invention will be described. FIG. 4 is a flowchart illustrating a simulation method according to the embodiment of the invention.

As shown in FIG. 4, in Step S1, an operator operates the operation device 12 to instruct the tandem press line 2 to perform a predetermined operation, and the operation device 12 thereby outputs an operation signal based on operator's operation.

In Step S2, the control device 9 receives the operation signal to execute a control program on the basis of the operation signal, and the control device 9 thereby generates and outputs control signals.

In Step S3, the simulation unit 19 of the arithmetic operation device 10c receives the control signals from the control device 9.

In Step S4, the simulation unit 19 executes the simulation program stored in the storage device 10a on the basis of the receive control signals, and the simulation unit 19 carries out simulation about how the presses 5a, 5b, 5c, and 5d, and the transferring devices 7a, 7b, and 7c operate when the control signals are actually output to the presses 5a, 5b, 5c, and 5d, and the transferring devices 7a, 7b, and 7c. The simulation unit 19 outputs result data of the simulation to the interference determining unit 23, the simple CG producing unit 21, and the data recording device 10e.

In Step S4, the simulation unit 19 transmits pseudo position signals representing the movement positions of the presses 5a, 5b, 5c, and 5d, and the transferring devices 7a, 7b, and 7c in the simulation, through the data server 10b to the control device 9. Then, in Step S2, the control device 9 outputs control signals on the basis of the pseudo position signals, and the processes of Steps S3 and S4 are performed again. At this time, when the operation signal is not input to the control device 9 in Step S2, the control device 9 executes the control program on the basis of only the position signals. When the operation signal is also input to the control device 9, the control device 9 executes the control program on the basis of both of the position signals and the operation signal.

In Step S5, the interference determining unit 23 determines whether or not the presses 5a, 5b, 5c, and 5d, and the transferring devices 7a, 7b, and 7c interfere with each other, on the basis of the result data of the simulation transmitted from the simulation unit 19. The interference determining unit 23 transmits the result data of the interference determination to the data recording device 10e.

In Step S6, the simple CG producing unit 21 produces animation data by simple CG, on the basis of the result data of the simulation transmitted from the simulation unit 19. The simple CG producing unit 21 transmits the animation data to the display device 10d so that the display device 10d can display the animation representing the result of the simulation on the screen of the display device 10d. Also, the simple CG producing unit 21 transmits the produced animation data to the data recording device 10e.

In Step S7, the data recording device 1e records the result data of the simulation received from the simulation unit 19, records the determination result data received from the interference determining unit 23, and records the animation data received from the simple CG producing unit 21.

Characteristics of the above-described present embodiment will be described in detail.

As the first characteristic, as described above, the simulation apparatus 10 can carry out the simulation of the associated operation on the basis of the simulation program. In addition, since the simulation is carried out in the state where the control device 9 that is the constituent element of the associated operation equipment is operated, it is possible to confirm both whether or not there is a problem in the control program and whether or not there is a problem in the operation of the control device 9.

As the second characteristic, the interference determining unit 23 automatically determines whether or not the presses 5a, 5b, 5c, and 5d, and the transferring devices 7a, 7b, and 7c interfere with each other. Accordingly, it is possible to accurately confirm whether or not there is interference without a great effort and time, unlike the case of determination based on user's eyes on the screen.

As the third characteristic, the control device 9 executes the control program and outputs the control signals, on the basis of the operation signal output from the operation device 12 according to the operation of the operator. Accordingly, it is possible to confirm whether the mobile devices interfere with each other in the operation which the operator wants to confirm, by instructing the operation using the operation device 12.

As the fourth characteristic, the operator can visibly confirm the associated operation of the whole tandem press line 2 with the displayed animation, by operating the operation device 12. Accordingly, even when the presses 5a, 5b, 5c, and 5d, and the transferring devices 7a, 7b, and 7c are not actually operated, the operation training for the operator may be performed. In addition, it is possible to simply and easily show the operation procedures of the tandem press line 2 determined in the control program, to the third person such as a customer of the tandem press line 2.

As the fifth characteristic, when the operation of the tandem press line 2 is stopped for emergency due to an operation problem or the like of the tandem press line 2, the presses 5a, 5b, 5c, and 5d, and the transferring devices 7a, 7b, and 7c may easily interfere with each other in the course of returning the presses 5a, 5b, 5c, and 5d, and the transferring devices 7a, 7b, and 7c from the stop positions to the initial positions of the driving. In this case, the operator operates the operation device 12 to instruct the tandem press line 2 to stop, and then operates the operation device 12 to instruct the tandem press line 2 to restart. Thereby, whether or not there is a problem in the restoration operation can be confirmed. In addition, the operation for instruction of stop may be performed at various timings. Accordingly, it is possible to carry out the simulation of the restoration operation from various stop states, it is possible to automatically determine the interference, and it is possible to confirm the restoration operation on the screen of the display device 10d.

As the sixth characteristic, the simulation unit 19 outputs the pseudo position signals on the basis of the result data of the simulation, and the control device 9 outputs the next control signals to the arithmetic operation device 10c on the basis of the pseudo position signals, considering the pseudo position signals as the position signals representing the operation positions from the actual presses 5a, 5b, 5c, and 5d, and transferring devices 7a, 7b, and 7c. Accordingly, it is possible to carry out the simulation, while the operations of the presses 5a, 5b, 5c, and 5d, and the transferring devices 7a, 7b, and 7c in the simulation are continuously traced.

As the seventh characteristic, the data recording device 10e records the result data of the simulation, the result data of the interference determination, and the animation data. Accordingly, the operation procedures of the control program on the basis of the recorded data can be examined in detail.

Second Embodiment

According to the second embodiment of the invention, the simulation device 10 of the first embodiment has the following configuration.

As shown by the broken line A in FIG. 5, the arithmetic operation device 10c, which is connected to the presses 5a, 5b, 5c, and 5d, and the transferring devices 7a, 7b, and 7c, of the simulation device 10 is configured to receive position signals representing the operation positions of the presses 5a, 5b, 5c, and 5d, and the transferring devices 7a, 7b, and 7c from the presses 5a, 5b, 5c, and 5d, and the transferring devices 7a, 7b, and 7c, when the tandem press line 2 is actually operating. The simple CG producing unit 21 of the arithmetic operation device 10c can produce animation data representing the operations of the presses 5a, 5b, 5c, and 5d, and the transferring devices 7a, 7b, and 7c, on the basis of the position signals. The display device 10d displays animation on the basis of the animation data.

As described above, the animation representing the actual operations can be displayed on the display device 10d, as well as the animation representing the result of the simulation for the presses 5a, 5b, 5c, and 5d, and the transferring devices 7a, 7b, and 7c. Accordingly, it is possible to perform remote monitoring of the tandem press line 2 using the display device 10d.

In order that a program for producing animation data on the basis of the position signals from the presses 5a, 5b, 5c, and 5d, and the transferring devices 7a, 7b, and 7c may be the same as a program for producing animation data on the basis of the result data of the simulation, the simulation program may be produced such that the result data of the simulation input to the simple CG producing unit 21 corresponds to the position signals from the presses 5a, 5b, 5c, and 5d, and the transferring devices 7a, 7b, and 7c. In this case, the result data of the simulation input to the simple CG producing unit 21 may be the aforementioned pseudo position signals.

Other Embodiment

The invention is not limited to the above-described embodiments, and may be variously modified within the scope of the concept of the invention.

In the above-described embodiment, the automatically controlled mobile devices are the presses 5a, 5b, 5c, and 5d, and the transferring devices 7a, 7b, and 7c, and the associated operation equipment is the tandem press line 2. However, the invention is not limited thereto. That is, the invention is applicable to associated operation equipment, in which a plurality of mobile devices operating in association with each other, the movement ranges of the mobile devices partially overlap with each other, and the mobile devices may interfere with each other when the operation procedures thereof is not appropriate.

For example, the invention is applicable to a process line of liquid crystal panels. In the process line of the liquid crystal panels, the automatically controlled mobile devices are a plurality of processing devices and transferring devices provided therebetween, and processes are performed on the liquid crystal panels by the procedure in which the process of the upstream processing device is followed by the process of the downstream processing device. Even in the process line of the liquid crystal panels, the movement ranges of the processing devices and the movement ranges of the transferring devices partially overlap with each other. Accordingly, in the case of high line process speed, it is highly necessary to verify the operation procedures described above.

In automatically controlled AGVs (Automated Guided Vehicle) as the mobile devices used in a semiconductor wafer producing line or the like, the movement ranges thereof partially overlap with each other, and thus interference may occur between the AGVs. Accordingly, the invention is applicable also to the producing line having the plurality of AGVs.

In tunnel excavation, when predetermined components are transferred from an opening position to an excavation position of a tunnel by a plurality of automatically controlled mobile devices, the mobile device may interfere with each other. Accordingly, also in this case, the invention is applicable to such a transferring line.

The invention claimed is:

1. A simulation apparatus for carrying out simulation for associated operation equipment provided with a plurality of mobile devices that operate in association with each other, and provided with a control device having a storage unit for storing a control program in which operation procedures are determined for the mobile devices to output control signals to the mobile devices, wherein the simulation apparatus comprises:
   (a) a storage device that stores a simulation program for carrying out simulation of the associated operation of the mobile devices on the basis of control signals outputted to the mobile devices; and
   (b) an arithmetic operation device that receives the control signals and that executes the simulation program on the basis of the control signals,
   wherein the control device is configured to receive position signals from the mobile devices, wherein the position signals represent operation positions of the mobile devices, and the control device is configured to output the control signals on the basis of the position signals, and
   the arithmetic operation device outputs pseudo position signals, corresponding to the position signals, to the control device on the basis of result data of the simulation, and the control device executes the control program on the basis of the pseudo position signals during simulation, and outputs the control signals to the arithmetic operation device.

2. The simulation apparatus according to claim 1, wherein the mobile devices have movement ranges partially overlapping with each other, and
   wherein the arithmetic operation device determines whether or not the mobile devices interfere with each other, on the basis of the simulation carried out by the arithmetic operation device.

3. The simulation apparatus according to claim 1, wherein the associated operation equipment is operable by a user to instruct the associated operation equipment to operate, and has an operation device outputting an operation signal based on user's operation, and
   wherein the control device executes the control program on the basis of the operation signal.

4. The simulation apparatus according to claim 3, wherein the operation device is operable by a user to instruct the associated operation equipment to stop and restart the operation,
   wherein the control device executes the control program on the basis of the operation signal,
   wherein, by the control program, restoration operation procedures are determined in order to move the mobile devices from operation stop positions to initial positions, and
   the arithmetic operation device determines whether or not the mobile devices interfere with each other when the restoration operation procedures are carried out.

5. The simulation apparatus according to claim 1, wherein the arithmetic operation device produces animation data representing the associated operation on the basis of the simulation carried out by the arithmetic operation device, and
   wherein the simulation apparatus further comprises:
   (c) a display device that displays animation on the basis of the animation data.

6. The simulation apparatus according to claim 5, wherein the arithmetic operation device is connected to the mobile devices, and receives position signals representing the operation positions of the mobile devices from the mobile devices in order to produce animation data representing the associated operation of the mobile devices on the basis of the position signals when the associated operation equipment is actually operating, and
   wherein the display device displays animation on the basis of the animation data.

7. The simulation apparatus according to claim 1, further comprising:
   (c) a data recording device that records data about the result of the simulation carried out by the arithmetic operation device.

8. The simulation apparatus according to claim 1, wherein the associated operation equipment is a tandem press line.

9. A simulation method for carrying out simulation for associated operation equipment provided with a plurality of mobile devices operating in association with each other, and provided with a control device having a storage unit for storing a control program in which operation procedures are determined for the mobile devices to output control signals to the mobile devices, wherein the mobile devices have movement ranges partially overlapping with each other, and the control device is configured to receive position signals from the mobile devices, wherein the position signals represent operation positions of the mobile devices, and the control device outputs the control signals on the basis of the position signals, wherein the simulation method comprises the steps of:
   (a) receiving the control signals, wherein the control signals are received by an arithmetic operation device; and
   (b) carrying out the simulation for the whole associated operation equipment on the basis of the received control signals. wherein the arithmetic operation device carries out the simulation,
   wherein in step (b), the arithmetic operation device outputs pseudo position signals corresponding to the positions signals to the control device on the basis of result data of the simulation carried out by the arithmetic operation device, and the control device executes the control program on the basis of the pseudo position signals during the simulation and outputs the control signals to the arithmetic operation device.

10. The simulation method according to claim 9, wherein the associated operation equipment is a tandem press line.

11. A simulation program for carrying out simulation for associated operation equipment provided with a plurality of mobile devices operating in association with each other, and provided with a control device having a storage unit for storing a control program in which operation procedures are determined for the mobile devices to output control signals to the mobile devices, wherein the mobile devices have movement ranges partially overlapping with each other, and the control device is configured to receive position signals from the mobile devices, wherein the position signals represent operation positions of the mobile devices, wherein the simulation program is stored on a storage device of a simulation apparatus, and the stimulation program causes computer of the simulation apparatus to execute the process comprising the steps of:

(a) receiving the control signals; and (b) carrying out the simulation for the whole associated operation equipment on the basis of the received control signals, wherein in step (b), pseudo position signals corresponding to the positions signals are output to the control device on the basis of result data of the simulation, and the control device executes the control program on the basis of the pseudo position signals during the simulation and outputs the control signals to be received in step (a).

12. The simulation program according to claim 11, wherein the associated operation equipment is a tandem press line.

* * * * *